US012322864B2

(12) United States Patent
Favreau et al.

(10) Patent No.: US 12,322,864 B2
(45) Date of Patent: Jun. 3, 2025

(54) CONFORMAL ANTENNA DEVICE

(71) Applicant: Raytheon Company, Waltham, MA (US)

(72) Inventors: Channing P. Favreau, Barre, MA (US); John P. Haven, Groton, MA (US); Randy T. Camasso, Methuen, MA (US)

(73) Assignee: Raytheon Company, Tewksbury, MA (US)

( * ) Notice: Subject to any disclaimer, the term of this patent is extended or adjusted under 35 U.S.C. 154(b) by 255 days.

(21) Appl. No.: 18/126,142

(22) Filed: Mar. 24, 2023

(65) Prior Publication Data

US 2024/0322446 A1 Sep. 26, 2024

(51) Int. Cl.
*H01Q 21/00* (2006.01)
*H01Q 1/22* (2006.01)
(Continued)

(52) U.S. Cl.
CPC ........... *H01Q 21/0025* (2013.01); *H01Q 1/22* (2013.01); *H01Q 21/061* (2013.01); *H01Q 23/00* (2013.01)

(58) Field of Classification Search
CPC ............. H01Q 21/0025; H01Q 21/061; H01Q 21/0087; H01Q 21/20; H01Q 21/062; H01Q 1/22; H01Q 23/00; H01Q 5/25
See application file for complete search history.

(56) References Cited

U.S. PATENT DOCUMENTS 7,057,563 B2 6/2006 Cox
7,265,719 B1 9/2007 Moosbrugger
(Continued)

FOREIGN PATENT DOCUMENTS

CN 211907697 U * 11/2020
CN 114156627 A * 3/2022
KR 20210133559 A * 11/2022

OTHER PUBLICATIONS

Chen Xi et al: "Ultrathin and Flexible Ultrawideband Antenna Array Based on Integrated Impedance Matching Line", IEEE Antennas and Wireless Propagation Letters, IEEE, Piscataway, NJ, US, vol. 22, No. 5, Dec. 13, 2022 (Dec. 13, 2022), pp. 960-964, XP011939931.
(Continued)

*Primary Examiner* — Seokjin Kim
(74) *Attorney, Agent, or Firm* — Getz Balich LLC

(57) ABSTRACT

A conformal antenna device is provided that includes a conformance panel, an antenna array, a combiner board, and a plurality of slats. The conformance panel has an inner radial surface, an outer radial surface, a width extending between first and second axial ends, and a length extending between first and second lateral ends. The conformance panel extends linearly in a widthwise direction and extends arcuately in a lengthwise direction. The conformance panel includes a plurality of apertures extending between the inner and outer radial surfaces. The antenna array is attached to the outer radial surface. The slats extend between the combiner board and the conformance panel in a spoke arrangement. Each slat includes a first plate and a second plate, and each second plate includes electrical circuitry and one or more components and is in signal communication with the antenna array.

20 Claims, 5 Drawing Sheets

(51) Int. Cl.
*H01Q 21/06* (2006.01)
*H01Q 23/00* (2006.01)

(56) References Cited

U.S. PATENT DOCUMENTS

| | | | | |
|---|---|---|---|---|
| 9,614,290 | B1 * | 4/2017 | Remski | H01Q 13/10 |
| 11,239,573 | B2 | 2/2022 | Shah | |
| 2009/0174605 | A1 | 7/2009 | Chang | |
| 2013/0082890 | A1 * | 4/2013 | Wang | H01Q 1/48 343/810 |
| 2017/0256855 | A1 * | 9/2017 | Robinson | H01Q 3/34 |
| 2018/0254553 | A1 * | 9/2018 | Logan | H01Q 21/067 |
| 2019/0356055 | A1 * | 11/2019 | Saito | H01Q 21/08 |

OTHER PUBLICATIONS

Ding Qingfeng et al: "Broadband Conformal TCDA Antenna for Wide-angle Scanning with a Compact Architecture", 2022 International Applied Computational Electromagnetics Society Symposium (Aces-China), IEEE, Dec. 9, 2022 (Dec. 9, 2022), pp. 1-3, XP034311716.

Jonathan P. Doane et al: "Wideband, wide scanning conformal arrays with practical integrated feeds", Electromagnetic Theory (EMTS), Proceedings of 2013 URSI International Symposium on, IEEE, May 20, 2013 (May 20, 2013), pp. 859-862, XP032441513.

International Search Report and Written Opinion for PCT Patent Application PCT/US2024/021173 dated Jun. 18, 2024.

* cited by examiner

| Layer | Constituent |
|---|---|
| 1 | WAIM |
| 2 | Tachyon 100G |
| 3 | Bondply |
| 4 | Outer Dipole |
| 5 | Kapton |
| 6 | Inner Dipole |
| 7 | Bondply |
| 8 | Inner Dielectric |
| 9 | Tachyon 100G |
| 10 | Ground Plane |
| 11 | Laminate |
| 12 | Stripline |
| 13 | Bondply |
| 14 | Laminate |
| 15 | Ground Plane |
| 16 | Plating |

CONFORMAL ANTENNA DEVICE

BACKGROUND OF THE INVENTION

1. Technical Field

The present disclosure relates to conformal active electronically scanned arrays in general, and to architectures for conformal active electronically scanned arrays in particular.

2. Background Information

An active electronically scanned array (AESA) is a type of phased array antenna that is a computer-controlled array antenna in which the beam of radio waves can be electronically steered to point in different directions without moving the antenna. In an AESA, each antenna element is connected to a solid-state transmit/receive module (TRM) under the control of a computer that performs the functions of transmitter and/or receiver for the antenna.

A planar ultrawideband modular antenna (PUMA) array is a type of ultrawideband (UWB) array that may utilize etched circuits and vias fabricated as a multilayer printed circuit board (PCB). A PUMA array may be described as having feed layers, dipole layers, and a wide-angle impedance matching (WAIM) layer.

A slat array architecture is an array architecture that includes a series of slats that are conventionally arranged perpendicular to the face of the array. Each slat provides a large surface area on which TRM modules and supporting components can be attached.

A conformal antenna or conformal array may be a flat array antenna that conforms to a prescribed shape, such as a curved surface. The multiple individual antennas mounted on or in the curved surface work together as a single antenna to transmit or receive radio waves.

SUMMARY

According to an aspect of the present disclosure, a conformal antenna device is provided that includes a conformance panel, an antenna array, a combiner board, and a plurality of slats. The conformance panel (CP) has an CP inner radial surface, a CP outer radial surface, a width extending between a first axial end and a second axial end, and a length extending between a first lateral end and a second lateral end. The conformance panel extends linearly in a widthwise direction and extends arcuately in a lengthwise direction. The conformance panel includes a plurality of apertures extending between the CP inner radial surface and the CP outer radial surface. The antenna array is attached to the outer radial surface of the conformance panel. The plurality of slats extend between the combiner board and the conformance panel in a spoke arrangement. Each slat includes a first plate and a second plate. Each second plate includes electrical circuitry and one or more components and is in signal communication with the antenna array.

In any of the aspects or embodiments described above and herein, the slats of the plurality of slats may be spaced apart from one another by one or more CB inter-slat spacings proximate the combiner board, and the plurality of slats may be spaced apart from one another by one or more CP inter-slat spacings proximate the combiner board, and each of the one or more CP inter-slat spacings may be greater than each of the one or more CB inter-slat spacings.

In any of the aspects or embodiments described above and herein, the one or more CP inter-slat spacings may be uniform, and the one or more CB inter-slat spacings may be uniform.

In any of the aspects or embodiments described above and herein, the combiner board may include a CB outer radial surface that extends arcuately between lengthwise ends, and the CB outer radial surface may have a CB arcuate configuration.

In any of the aspects or embodiments described above and herein, the conformance panel extending arcuately in a lengthwise direction is a CP arcuate configuration, and the CB arcuate configuration may nest with the CP arcuate configuration.

In any of the aspects or embodiments described above and herein, the CP arcuate configuration may be disposed at a first radius, and the CB arcuate configuration may be disposed at a second radius, and the second radius may be less than the first radius.

In any of the aspects or embodiments described above and herein, the conformance panel may include a plurality of slat tab rows extending outwardly from the CP inner radial surface, and the slat tab rows may extend between the first axial end and the second axial end of the conformance panel, and each slat tab row may include a plurality of slat tabs.

In any of the aspects or embodiments described above and herein, the antenna array may have an inner radial side, an outer radial side, and a plurality of finger interfaces extending out from the inner radial side. Each finger interface of the plurality of finger interfaces may extend through a respective aperture extending between the CP inner radial surface and the CP outer radial surface, and outwardly from the inner radial surface of the conformance panel. The second plate of each slat may be in signal communication with one or more of the finger interfaces.

In any of the aspects or embodiments described above and herein, the finger interfaces of the plurality of finger interfaces may be disposed in rows parallel to the slat tab rows, and each respective slat tab row may be spaced apart a distance from a respective finger interface row. Each slat of the plurality of slats may be disposed between a respective slat tab row and a finger interface row. Each finger interface may be in signal communication with the second plate of the slat disposed between the respective slat tab row and a finger interface row.

In any of the aspects or embodiments described above and herein, the antenna array may be a planar ultrawideband modular antenna (PUMA) array attached to the outer radial surface of the conformance panel. The PUMA array may have an inner radial side, an outer radial side, a first PA axial end, and a second PA axial end.

In any of the aspects or embodiments described above and herein, the PUMA array may include a plurality of finger interfaces extending out from the inner radial side. Each finger interface may extend through a respective aperture extending between the CP inner radial surface and the CP outer radial surface, and outwardly from the inner radial surface of the conformance panel. The second plate of each slat may be in signal communication with one or more of the finger interfaces.

In any of the aspects or embodiments described above and herein, the PUMA array (PA) may include rows of PA apertures extending through the PUMA array. The rows of PA apertures may extend between the first PA axial end and the second PA axial end.

In any of the aspects or embodiments described above and herein, the PUMA array may include a stack of feed layers, dipole layers, and a wide-angle impedance matching (WAIM) layer disposed between the inner radial side and the outer radial side. The PUMA array may include a plurality of channels disposed in the feed layers or the WAIM layer. The channels may extend between the first PA axial end and the second PA axial end, and the plurality of channels may be disposed in both the feed layers and the dipole layers.

In any of the aspects or embodiments described above and herein, the PUMA array may extend linearly in a widthwise direction and extend arcuately in a lengthwise direction and may be configured to mate with the conformance panel.

In any of the aspects or embodiments described above and herein, the second plate of each slat may be a printed wire board or a printed circuit.

In any of the aspects or embodiments described above and herein, the first plate of each slat may be configured as a thermal sink and may be configured to carry a ground connection between the conformance panel and the combiner board.

In any of the aspects or embodiments described above and herein, the conformance panel may be attached to each respective slat by one or more fasteners engaged with the first panel of the respective slat.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
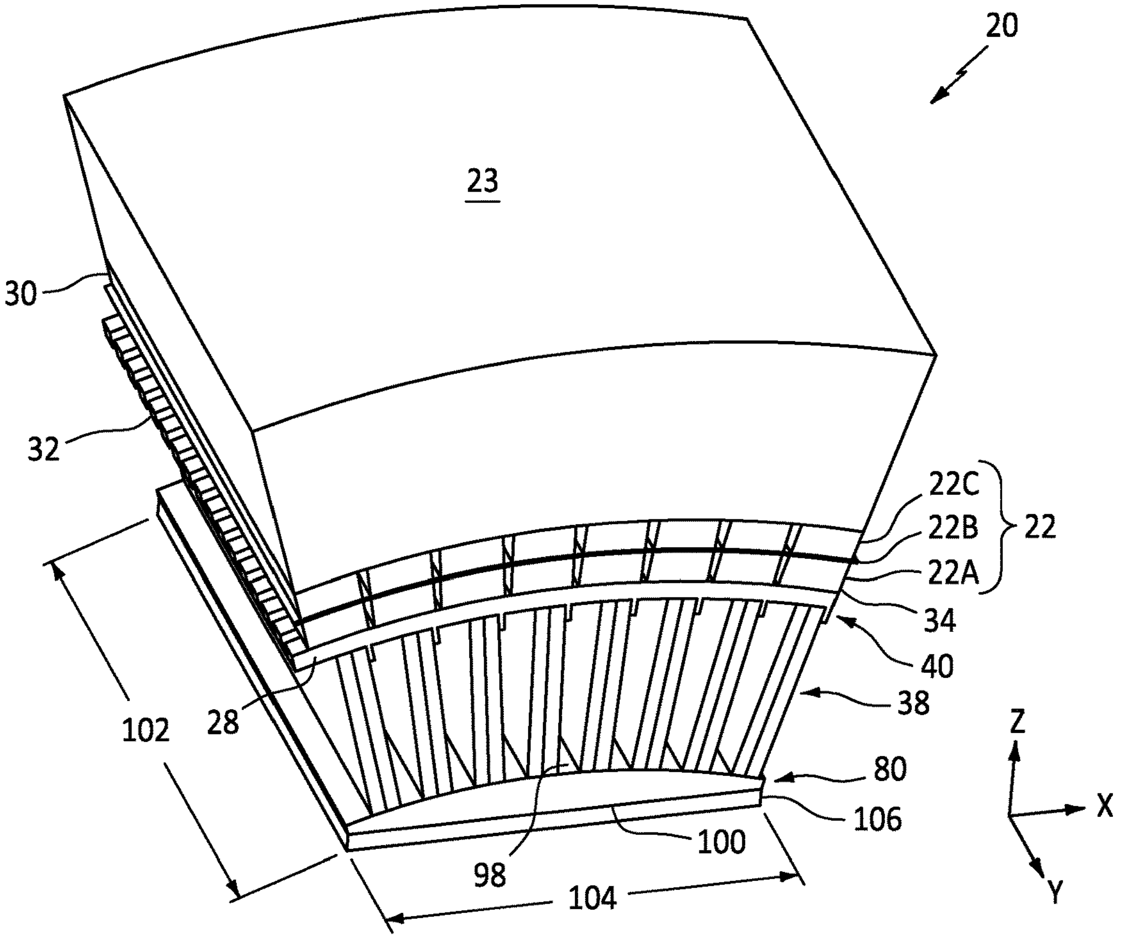
FIG. 1 is a diagrammatic perspective view of a present disclosure AESA antenna device embodiment.
Figure 2:
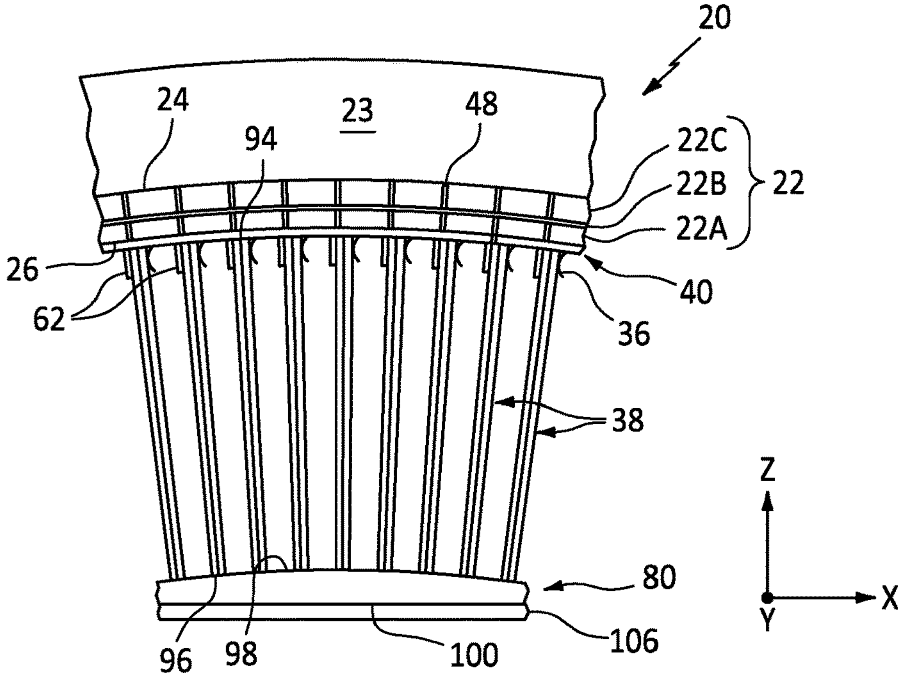
FIG. 2 is a diagrammatic planar view of a present disclosure AESA antenna device embodiment.
Figure 3:
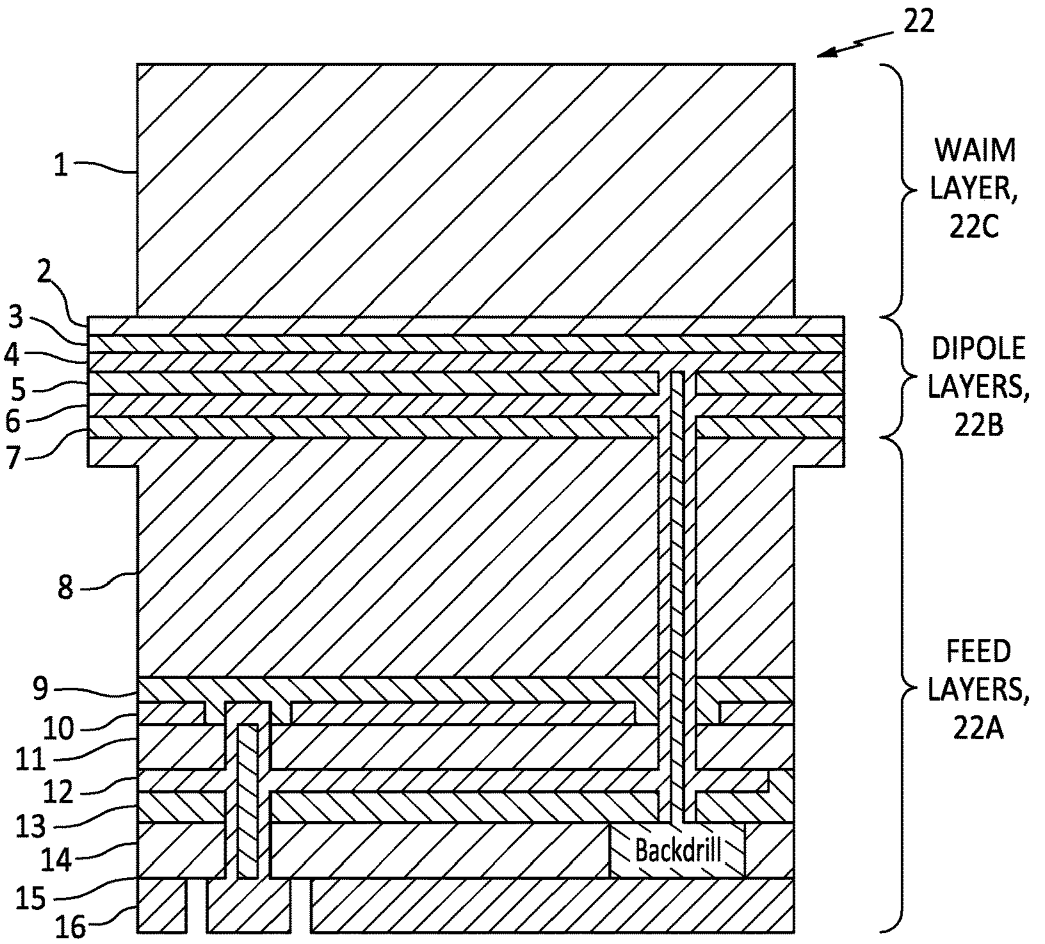
FIG. 3 is a diagrammatic representation of a PUMA array embodiment.

Referring to FIGS. 1-3, the present disclosure is directed to a conformal wideband active electronically scanned array (AESA) antenna device 20 that includes an antenna array such as a planar ultrawideband modular antenna (PUMA) array 22, a plurality of slats 38, a conformance panel 40, and a combiner board 80. The present disclosure is not limited to use with a PUMA array 22. Alternative embodiments may include a patch antenna array or the like. To facilitate the description herein, the antenna array will be described in terms of a PUMA array 22.

The PUMA array 22 is an ultrawideband (UWB) array comprised of unit cells. Collectively, the PUMA array 22 may be described as having an outer radial side 24, an inner radial side 26, a first axial end 28, a second axial end 30, a first lateral end 32, and a second lateral end 34. The PUMA array 22 shown in FIGS. 1 and 2 is a section of array; hence, the first and second axial ends 28, 30 and the first and second lateral ends 32, 34 shown may not be the respective axial ends and lateral ends of a full PUMA array 22.

Each of the unit cells in the PUMA array 22 includes circuits and vias fabricated as a multilayer printed circuit board (PCB), and at least one signal connector (e.g., a finger interface 36) for signal connection with a slat 38 as will be described herein. Each unit cell may be described as having feed layers 22A, dipole layers 22B, and a wide angle impedance matching (WAIM) layer 22C. The aforesaid layers 22A-C in each unit cell are disposed in a stacked configuration such that the dipole layers 22B are disposed between the feed layers 22A and the WAIM layer 22C, with the feed layers 22A defining the inner radial side 26 of the array 22 and the WAIM layer 22C defining the outer radial side 24 of the array 22. A radome 23 is typically disposed outside of the WAIM layer 22C. The first and second axial ends 28, 30 of the PUMA array 22 are disposed on opposite axial ends (which may be referred to as the widthwise ends-extending along a Y-axis) and the first and second lateral ends 32, 34 of the PUMA array 22 are disposed on opposite lateral ends (which may be referred to as the lengthwise ends—extending along an X-axis). The inner radial side 26 of the PUMA array 22 is disposed contiguous with and is attached to the conformance panel 40; e.g., the PUMA array 22 may be bonded to the conformance panel 40. The feed layers 22A, the dipole layers 22B, and the WAIM layer 22C of the unit cells may collectively be referred to as the "radiator" of the PUMA array 22. The WAIM layer 22C is adhered, or bonded, or otherwise attached to the dipole layers 22B. The radome 23 may have an interior surface that is faceted for interface with the WAIM layer 22C of the PUMA array 22.

FIG. 3 illustrates a non-limiting example of a PUMA array 22, including the specific layers within the respective feed layers 22A, dipole layers 22B, and WAIM layer 22C. This example of a PUMA array 22 is provided to illustrate a PUMA array 22 and the present disclosure is not limited to any particular PUMA array configuration.

Figure 4:
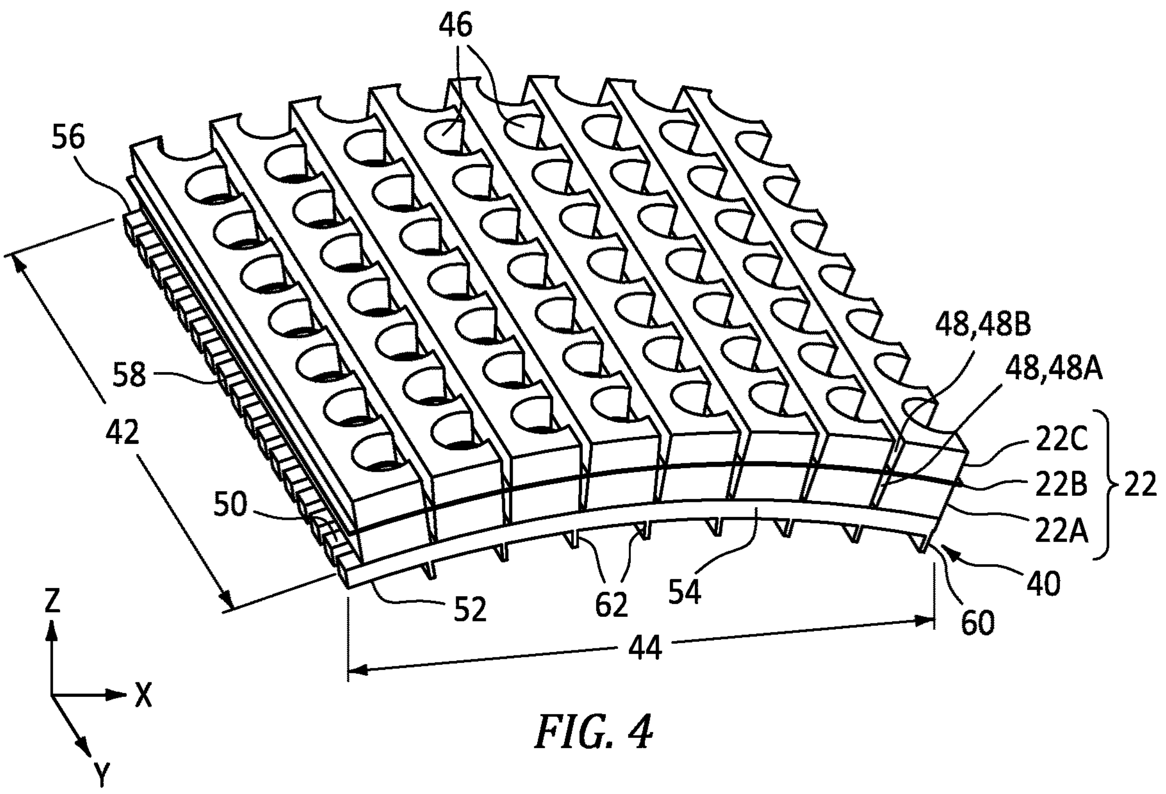
FIG. 4 is a diagrammatic perspective view of a present disclosure conformance panel and a portion of a PUMA array embodiment.
Figure 5:
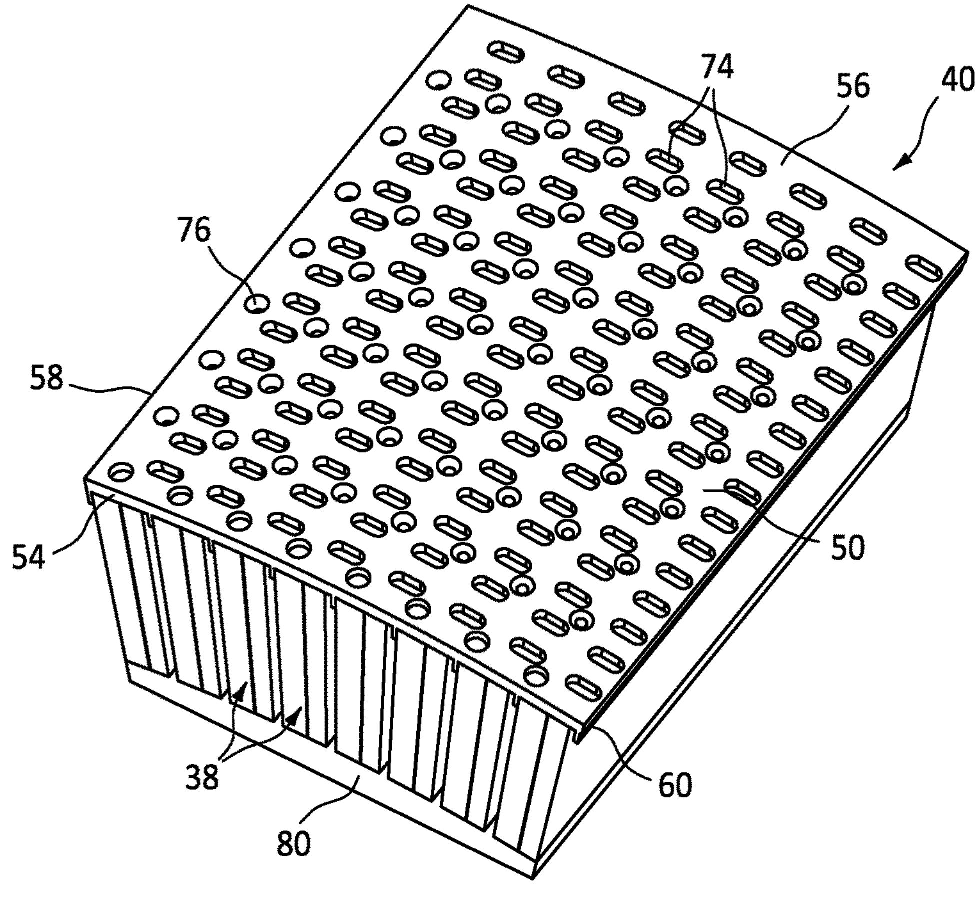
FIG. 5 is a diagrammatic perspective view of a present disclosure conformance panel, a portion of a PUMA array embodiment, slats, and a combiner board.
Figure 6:
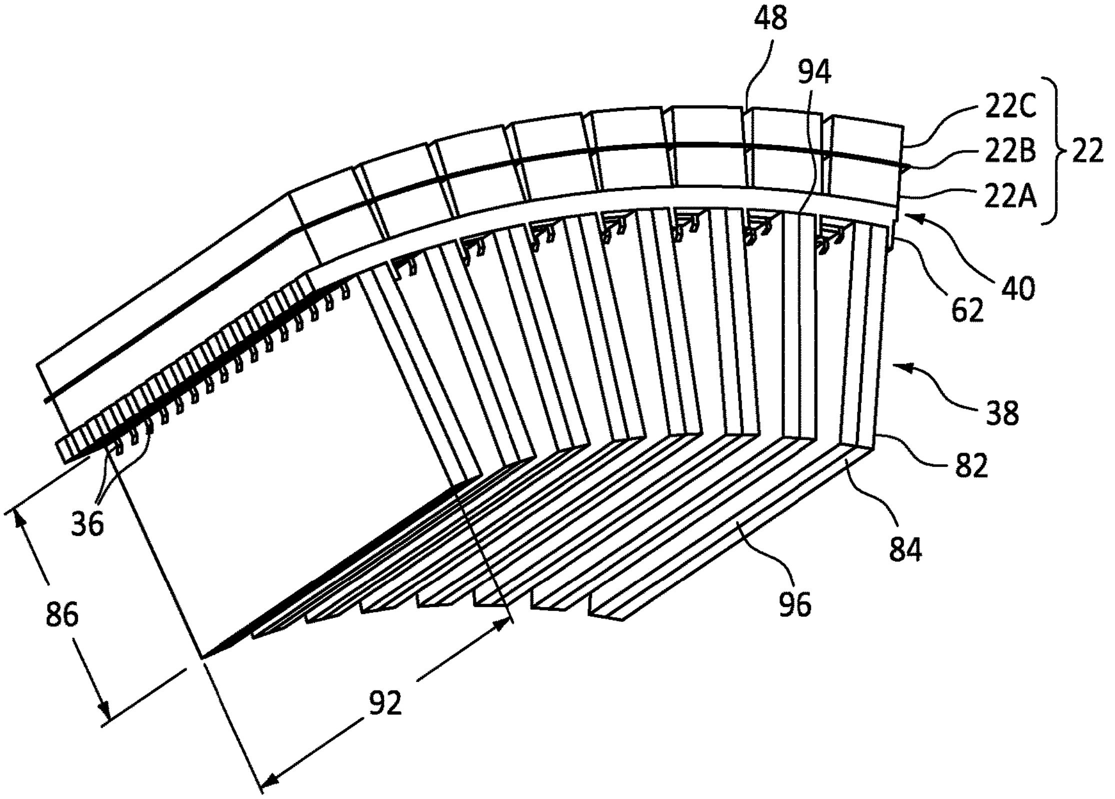
FIG. 6 is a diagrammatic perspective view of a present disclosure conformance panel, a portion of a PUMA array embodiment, slats, and a combiner board.
Figure 7:
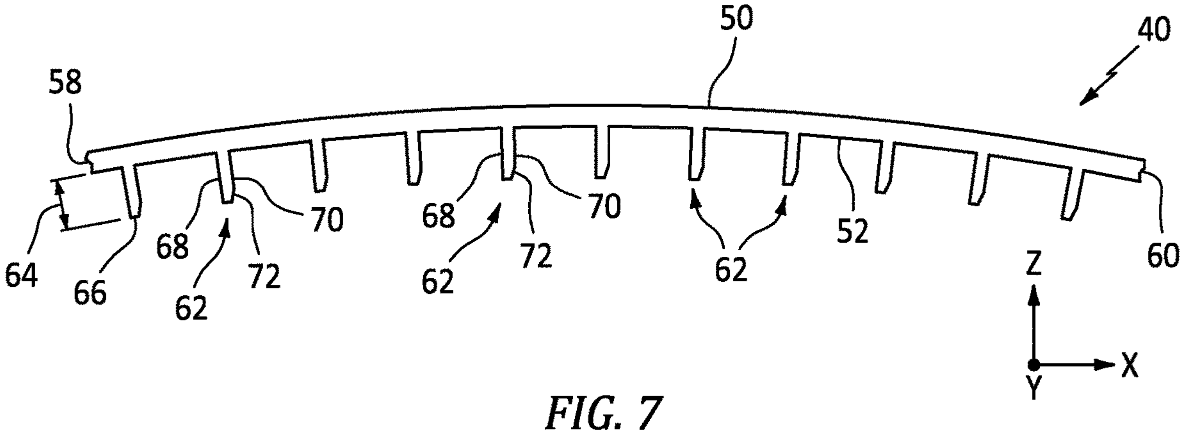
FIG. 7 is a diagrammatic planar view of a present disclosure conformance panel embodiment.

Referring to FIG. 4, the conformance panel 40 is configured to have a width 42 that extends linearly (i.e., extends along a straight line between two points, along a Y-axis) between axial ends 54, 56, and is configured to have a length 44 that extends arcuately between lengthwise ends 58, 60. The arcuate lengthwise shape of the conformance panel 40 may be described as an arcuate configuration within the X-Z plane. The feed layers 22A and the dipole layers 22B are configured to permit the PUMA array 22 to assume the widthwise linear configuration and the lengthwise arcuate configuration in the X-Z plane of the conformance panel 40.

As shown in FIG. 3, the feed layers 22A may include one or more laminate layers, one or more bondply layers, one or more ground plane layers, and the like. According to the present disclosure these layers may be disposed in an arcuate configuration within the X-Z plane to create the conformal antenna. The aforesaid feed layers 22A may be formed having the desired X-Z plane lengthwise arcuate configuration, or the aforesaid layers may be configured to be disposable in (e.g., bendable to) the desired X-Z plane lengthwise arcuate configuration. The dipole layers 22B may include one or more bondply layers, an outer dipole layer, and inner dipole layer, and a dielectric layer disposed between the inner and outer dipole layers. The inner and outer dipole layers and the dielectric layer may be formed to have a lengthwise arcuate configuration within the X-Z plane, or the aforesaid layers may be configured to be disposable in (e.g., bendable to) the aforesaid X-Z plane lengthwise arcuate configuration. Regarding the latter, the layers (e.g., the dielectric layers, the dipole layers, and the like) may comprise material having sufficient flexibility to permit the layers to be bent into the desired X-Z plane lengthwise arcuate configuration. As an example, the dipole layers 22B may comprise thin rolled copper layers that can be bent into the desired X-Z plane arcuate configuration.

Referring to FIG. 4, the PUMA array 22 includes rows of through holes 46 extending through the feed layers 22A, the dipole layers 22B, and the WAIM layer 22C, i.e., through the radiator. The through holes 46 are configured for tuning and to facilitate attaching the conformance panel 40 (and the PUMA array 22 attached thereto) to the slats 38. The rows of through holes 46 may be described as being arranged in widthwise rows (i.e., rows extending between the first and second axial ends 28, 30). In some embodiments, the PUMA array 22 may include rows of widthwise extending channels 48 disposed in the feed layers 22A and the WAIM layer 22C. The widthwise extending channels 48 may include inner radial portions 48A and outer radial portions 48B. The inner and outer radial channel portions 48A, 48B may be aligned with one another. The widthwise channels 48 are configured to facilitate the lengthwise arcuate configuration in the X-Z plane; e.g., to provide flexibility within the feed layers 22A and the WAIM layer 22C in the X-Z plane. In the embodiment shown in FIG. 4, each of the through holes 46 in a given widthwise row is in communication with a respective widthwise extending channel 48.

The WAIM layer 22C has an interior surface and an opposite exterior surface. The WAIM layer 22C interior surface is contiguous with and attached to the dipole layers 22B. The WAIM layer 22C may be produced having the desired X-Z plane lengthwise arcuate configuration, or the WAIM layer 22C may be configured to be disposable (e.g., bendable) in the desired X-Z plane arcuate configuration.

The radome 23 is a protective structure that is transparent to electromagnetic/RF signals. The term “transparent” is used here to mean that the radome 23 is configured to not appreciably attenuate electromagnetic/RF signals passing there through.

Referring to FIGS. 5-8, the conformance panel 40 includes an outer radial surface 50, an inner radial surface 52, a first axial end 54, a second axial end 56, a first lateral end 58, and a second lateral end 60. The conformance panel 40 extends widthwise between the first and second axial ends 54, 56 and lengthwise between the first and second lateral ends 58, 60. The conformance panel 40 extends linearly in the widthwise direction between the axial ends 54, 56 (i.e., extends along a straight line between two points, along a Y-axis), and extends arcuately between the lengthwise ends 58, 60 (i.e., along an arcuate line within the X-Z plane). In some embodiments, the lengthwise arcuate configuration of the conformance panel 40 in the X-Z plane may be a constant radius. In some embodiments, the lengthwise arcuate configuration of the conformance panel 40 in the X-Z plane is not a constant radius; e.g., the lengthwise arcuate configuration of the conformance panel 40 in the X-Z plane may include a plurality of different radii.

The conformance panel 40 includes a plurality of slat tabs 62 extending outwardly from the inner radial surface 52. The slat tabs 62 may be arranged in rows extending between the first and second axial ends 54, 56 of the conformance panel 40. The slat tab rows may be oriented perpendicular relative to the first and second axial ends 54, 56. The slat tab 62 in each row may be a single continuous slat tab 62 extending between the first and second axial ends 54, 56, or there may be a plurality slat tabs 62 disposed in each row.

Each slat tab 62 has a length 64 that extends from the inner radial surface 52 to a distal end 66. Each slat tab 62 has a first lateral surface 68 and an opposite second lateral surface 70. As will be disclosed herein, the second lateral surface 70 of each slat tab 62 is disposed contiguous with a slat 38. In some embodiments, a slat tab 62 may include a chamfer 72 extending between the second lateral surface 70 and the distal end 66.

The conformance panel 40 includes rows of apertures 74 extending through the inner and outer radial surfaces 52, 50. In some embodiments, the apertures 74 may have a slot configuration (e.g., oval, rectangular, or the like) having a major axis and a minor axis. The major axis is greater than the minor axis. The present disclosure is not limited to any particular aperture 74 geometry. The aperture 74 rows may extend parallel with the slat tab 62 rows.

The conformance panel 40 may include rows of fastener apertures 76 extending through the inner and outer radial surfaces 52, 50. Each row of fastener apertures 76 extends between the first and second axial ends 54, 56 and includes a plurality of fastener apertures 76. Each fastener aperture 76 row may be oriented perpendicular relative to the first and second axial ends 54, 56. Each fastener aperture 76 is configured to receive a fastener 78 that is used to secure a respective slat 38 to the conformance panel 40 and to carry a ground connection therebetween. In some applications, each fastener aperture 76 is configured such that the head of the fastener 78 is countersunk when installed and therefore does not extend above the outer radial surface 50 of the conformance panel 40; e.g., an aperture configured to receive a bevel head fastener.

The slats 38 extend between the combiner board 80 and the conformance panel 40. Each slat 38 includes a first plate (which may be referred to hereinafter as a “cold plate 82”) and a second plate (which may be referred to hereinafter as a “circuit board 84”). The cold plate 82 and the circuit board 84 of each slat 38 may be attached to one another. The circuit board 84 includes electrical circuitry and components. The electrical circuitry and components may be attached to a substrate, or the electrical circuitry and components may be integral; e.g., in the form of a printed wire board (PWB) or a printed circuit board (PCB), or the like. The circuit board 84 of each slat 38 is configured for signal communication to and from the PUMA array 22 and to and from external devices. The cold plate 82 provides an electrical ground path between the PUMA array 22 and the combiner board 80. The cold plate 82 may be configured to function as a thermal energy sink, accepting thermal energy transfer from the circuit board 84 (and/or components attached thereto) and dissipating that thermal energy. The cold plate 82 may also be configured to provide structural support to the circuit board 84. Each slat 38 has a height 86 extending between an outer end surface 88 and an inner end surface 90, and a width 92 extending between a first axial end 94 and a second axial end 96. Embodiments of the present disclosure may utilize different slat heights 86, and the present disclosure is not therefore limited to any particular slat height 86. The circuit board 84 is configured to create a signal connection with the feed layers of the PUMA array 22. For example, finger interfaces 36 that extend outwardly from each unit cell of the PUMA array 22 may engage with the circuit board 84 to permit signal communication between the circuit board 84 and the PUMA array 22. Although finger interfaces 36 provide a desirable means of providing signal connection, the present disclosure is not limited thereto. The circuitry within the circuit board 84 may be configured (e.g., configured to include microstrip tapering) to provide impedance matching between the circuit board 84, the finger interfaces 36 and the PUMA array 22.

The combiner board 80 may be a printed wire board (PWB) or a printed circuit board (PCB) that is configured to establish signal communication with the slats 38 and external components used in the operation of the present disclosure AESA antenna device 20. The combiner board 80 has an outer surface 98, an inner surface 100, a width 102 that extends linearly (i.e., extends along a straight line between two points, along a Y-axis), and a length 104. The outer surface 98 extends arcuately between lengthwise ends. The lengthwise arcuate configuration of the outer surface 98 may be described as an arcuate configuration within the X-Z plane. Like the conformance panel 40, the outer surface 98 of the combiner board 80 may have a lengthwise arcuate configuration in the X-Z plane that is a constant radius, or it may have a lengthwise arcuate configuration in the X-Z plane that includes a plurality of different radii. The outer surface lengthwise arcuate configuration may be described as having a nested relationship with the X-Z plane lengthwise arcuate configuration of the conformance panel 40 and the PUMA array 22. For example, in some embodiments the X-Z plane lengthwise arcuate configuration of the present disclosure AESA antenna device 20 components (e.g., the outer surface 98 of combiner board 80, the conformance panel 40, and the PUMA array 22) may share a point of origin, with the lengthwise arcuate configuration of each component having a different radius. In other embodiments, the relative arcuate configurations of the outer surface 98 of the combiner board 80 and the conformance panel 40 are such that the spacing therebetween is constant at any particular lengthwise position. In other words, the curvature of the outer surface 98 of the combiner board 80 may not be parti-circular and the curvature of the conformance panel 40 may not be parti-circular, but the aforesaid curvatures track with one another. In still other embodiments, the relative arcuate configurations of the outer surface 98 of the combiner board 80 and the conformance panel 40 may not track exactly with each other and the relative spacing therebetween may vary.

In some embodiments, the combiner board 80 may be configured for mechanical attachment with each respective slat 38; e.g., the combiner board 80 may include physical features (e.g., slots), or a fastener element (e.g., mechanical fasteners like a screw or a bonding agent, or the like), or some combination that facilitates attachment between the slats 38 and the combiner board 80.

In some embodiments, the present disclosure AESA antenna device 20 may include a base plate 106 (e.g., see FIGS. 1 and 2) attached to the combiner board 80. The base plate 106 may be configured to facilitate mounting of the AESA antenna device 20, or to facilitate connection of the present disclosure AESA antenna device 20 to components external to the AESA antenna device 20, or the like, or any combination thereof.

The slats 38 extend between the combiner board 80 and the conformance panel 40 in a spoke-like fashion. The inter-spoke spacing at the combiner board 80 is less than the inter-spoke spacing at the conformance panel 40. The slats 38 may be uniformly spaced relative to one another. For example, in some embodiments the inter-spoke spacing at the combiner board 80 may be uniform, and/or in some embodiments the inter-spoke spacing at the conformance panel 40 may be uniform. The present disclosure is not, however, limited to uniform inter-spoke spacing at the combiner board 80 or uniform inter-spoke spacing at the conformance panel 40. The inter-spoke spacing may be, but is not required to be, uniform in the widthwise direction between the first and second axial ends 94, 96, 54, 56 of the combiner board 80 and the conformance panel 40.

The architecture of present disclosure AESA antenna device 20 facilitates the production of the device 20, decreases the time and money associated with producing the device 20, and lends the device 20 to modular configuration. The PUMA array 22 is attached to the outer radial surface 50 of the conformance panel 40 with the finger interfaces 36 (or other connectors) extending outwardly from the array 22 and through the apertures 74 within the conformance panel 40 so that the finger interfaces 36 extend outwardly from the inner radial surface 52 of the conformance panel 40. The PUMA array 22 (i.e., the feed layers 22A, the dipole layers 22B, and WAIM layer 22C) is configured to permit the PUMA array 22 to assume an arcuate configuration in the X-Z plane. As stated herein, the inner and outer dipole layers and the dielectric layers may be produced to have an arcuate configuration within the X-Z plane that mates with the curvature of the conformance panel 40, or the aforesaid layers may be configured (e.g., bendable) to be disposable in the aforesaid X-Z plane arcuate configuration. In either of these configurations, some embodiments of the PUMA array 22 may include rows of widthwise extending channels 48 disposed in the feed layers 22A and the WAIM layer 22C to facilitate the X-Z plane arcuate configuration.

Figure 8:
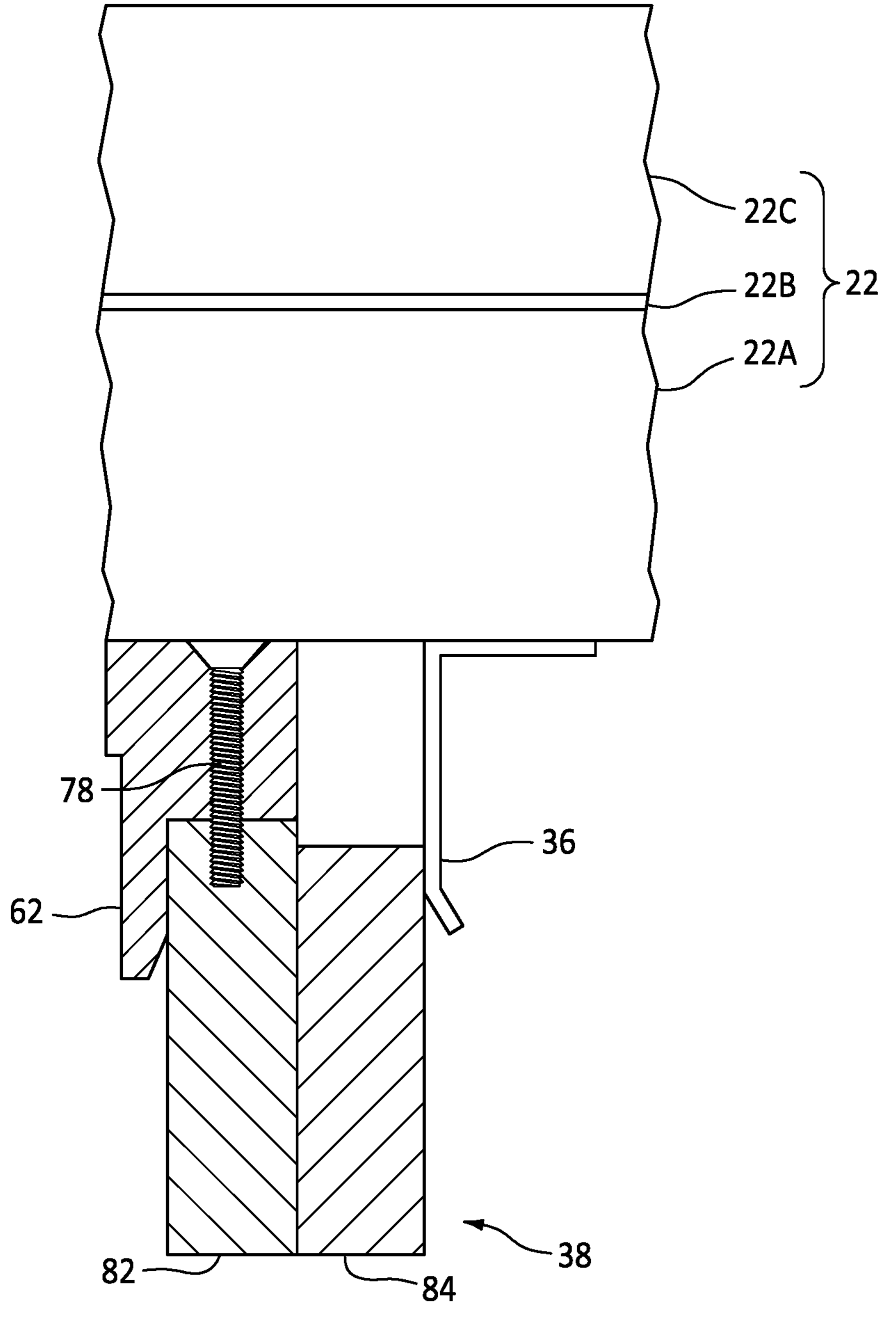
FIG. 8 is a diagrammatic view of a portion of a present disclosure conformance panel, a portion of a PUMA array embodiment, and a slat.

Each slat 38 is inserted in a respective region disposed at the inner radial surface 52 of the conformance panel 40, between a respective slat tab 62 row and the finger interfaces 36 associated with the row (e.g., see FIG. 8). Once the slat 38 is inserted, the finger interfaces 36 extending out from the PUMA array 22 that are associated with that row may be biased against the circuit board of that slat 38 to create a connection that permits signal communication between the circuit board of that slat 38 and the unit cells of the PUMA array 22 of that row. In the process of inserting the slat 38 or subsequent to the slat 38 insertion, fasteners 78 may be disposed through the fastener apertures 76 within the conformance panel 40 for engagement with the cold plate 82 portion of the respective slat 38. In this manner, each respective slat 38 is secured to the conformance panel 40, the circuit board 84 portion of the slat 38 is placed in signal communication with the PUMA array 22 via the finger interfaces 36 (or other connectors), and a ground connection is established through the cold plate 82 portion of the slat 38. As stated above, the rows of through holes 46 extending through the feed layers 22A, dipole layers 22B, and WAIM layer 22C facilitate attachment between the conformance panel 40 and the slats 38 by providing ready access to the fastener apertures 76 disposed in the conformance panel 40. Once the slats 38 are secured to the conformance panel 40, the radome 23 may be disposed/attached outside of the PUMA array 22. Before or after the slats 38 are attached to the conformance panel 40, the slats 38 may be attached to and placed in signal communication with the combiner board 80.

The present disclosure AESA antenna device 20 architecture is scalable to cover different frequencies and thereby be broadly applicable across multiple platforms. For example in a first embodiment, the present disclosure AESA antenna device 20 may be configured with a PUMA array 22 curvature, slat height 86 (i.e., the distance between the inner and outer end surfaces 88, 90), and inter-slat spacing associated with a first frequency range, and in a second embodiment the present disclosure AESA antenna device 20 may be configured with a PUMA array 22 curvature, associated slat height 86, and inter-slat spacing associated with a second frequency range, and so on. As a specific example, a present disclosure AESA antenna device 20 with a four-inch (4 in.) radius curvature may be configured for use with frequencies in the V-band range (~40-75 GHZ). As another example, a present disclosure AESA antenna device 20 with a six-inch (6 in.) radius curvature may be configured for use with frequencies in the X-band range (~8-12 GHz). As another example, a present disclosure AESA antenna device 20 with an eight-inch (8 in.) radius curvature may be configured for use with frequencies in the KA-band range (~27-40 GHz). These examples are intended to illustrate that the architecture of the present disclosure is readily scalable. The present disclosure architecture also permits unit cell spacing to be varied (which may implicate slat spacing) to vary frequency characteristics of the antenna.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A conformal antenna device, comprising:

a conformance panel (CP) having an CP inner radial surface and a CP outer radial surface, a width extending between a first axial end and a second axial end, a length extending between a first lateral end and a second lateral end, wherein the conformance panel extends linearly in a widthwise direction and extends arcuately in a lengthwise direction, the conformance panel including a plurality of apertures extending between the CP inner radial surface and the CP outer radial surface;

an antenna array attached to the outer radial surface of the conformance panel;

a combiner board (CB); and a plurality of slats extending between the combiner board and the conformance panel in a spoke arrangement, wherein each slat includes a first plate and a second plate, each second plate including electrical circuitry and one or more components, and each second plate is in signal communication with the antenna array.

2. The conformal antenna of claim 1, wherein the slats of the plurality of slats are spaced apart from one another by one or more CB inter-slat spacings proximate the combiner board, and the plurality of slats are spaced apart from one another by one or more CP inter-slat spacings proximate the combiner board, and each of the one or more CP inter-slat spacings are greater than each of the one or more CB inter-slat spacings.

3. The conformal antenna of claim 2, wherein the one or more CP inter-slat spacings are uniform.

4. The conformal antenna of claim 2, wherein the one or more CB inter-slat spacings are uniform.

5. The conformal antenna device of claim 1, wherein the combiner board includes a CB outer radial surface that extends arcuately between lengthwise ends, and the CB outer radial surface has a CB arcuate configuration.

6. The conformal antenna of claim 5, wherein the conformance panel extending arcuately in a lengthwise direction is a CP arcuate configuration; and wherein the CB arcuate configuration nests with the CP arcuate configuration.

7. The conformal antenna of claim 6, wherein the CP arcuate configuration is disposed at a first radius, and the CB arcuate configuration is disposed at a second radius, and the second radius is less than the first radius.

8. The conformal antenna of claim 1, wherein the conformance panel includes a plurality of slat tab rows extending outwardly from the CP inner radial surface, the slat tab rows extending between the first axial end and the second axial end of the conformance panel.

9. The conformal antenna of claim 8, wherein each slat tab row includes a plurality of slat tabs.

10. The conformal antenna device of claim 8, comprising:

wherein the antenna array has an inner radial side, an outer radial side, and a plurality of finger interfaces extending out from the inner radial side;

wherein each finger interface of the plurality of finger interfaces extends through a respective said aperture extending between the CP inner radial surface and the CP outer radial surface, and outwardly from the inner radial surface of the conformance panel;

wherein the second plate of each slat is in signal communication with one or more of the finger interfaces.

11. The conformal antenna of claim 9, wherein the finger interfaces of the plurality of finger interfaces are disposed in rows parallel to the slat tab rows, and each respective slat tab row is spaced apart a distance from a respective finger interface row;

wherein each said slat of the plurality of slats is disposed between a respective slat tab row and a finger interface row; and wherein each said finger interface is in signal communication with the second plate of the slat disposed between the respective slat tab row and a finger interface row.

12. The conformal antenna device of claim 1, wherein the antenna array is a planar ultrawideband modular antenna (PUMA) array attached to the outer radial surface of the conformance panel, the PUMA array having an inner radial side, an outer radial side, a first PA axial end, and a second PA axial end.

13. The conformal antenna array of claim 12, wherein the PUMA array includes a plurality of finger interfaces extending out from the inner radial side;

wherein each finger interface of the plurality of finger interfaces extends through a respective said aperture extending between the CP inner radial surface and the CP outer radial surface, and outwardly from the inner radial surface of the conformance panel;

wherein the second plate of each slat is in signal communication with one or more of the finger interfaces.

14. The conformal antenna of claim 12, wherein the PUMA array (PA) includes rows of PA apertures extending through the PUMA array, the rows of PA apertures extending between the first PA axial end and the second PA axial end.

15. The conformal antenna of claim 12, wherein the PUMA array includes a stack of feed layers, dipole layers, and a wide-angle impedance matching (WAIM) layer disposed between the inner radial side and the outer radial side, and a plurality of channels disposed in the feed layers or the WAIM layer, the channels extending between the first PA axial end and the second PA axial end.

16. The conformal antenna of claim 15, wherein the channels of the plurality of channels are disposed in both the feed layers and the dipole layers.

17. The conformal antenna of claim 12, wherein the PUMA array extends linearly in a widthwise direction and extends arcuately in a lengthwise direction and is configured to mate with the conformance panel.

18. The conformal antenna of claim 1, wherein the second plate of each slat of the plurality of slats is a printed wire board or a printed circuit.

19. The conformal antenna of claim 18, wherein the first plate of each slat of the plurality of slats is configured as a thermal sink and is configured to carry a ground connection between the conformance panel and the combiner board.

20. The conformal antenna of claim 11, wherein the conformance panel is attached to each respective slat by one or more fasteners engaged with the first panel of the respective slat.

* * * * *